US011022333B2

(12) United States Patent
Zhao et al.

(10) Patent No.: US 11,022,333 B2
(45) Date of Patent: Jun. 1, 2021

(54) CONTROL FOR DEVICE IN A PREDETERMINED SPACE AREA

(71) Applicant: Carrier Corporation, Palm Beach Gardens, FL (US)

(72) Inventors: Jianwei Zhao, Shanghai (CN); Xiaowei Wu, Shanghai (CN); Hon Ming Ng, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/470,009

(22) PCT Filed: Dec. 20, 2017

(86) PCT No.: PCT/US2017/067665
§ 371 (c)(1),
(2) Date: Jun. 14, 2019

(87) PCT Pub. No.: WO2018/125720
PCT Pub. Date: Jul. 5, 2018

(65) Prior Publication Data
US 2020/0011558 A1 Jan. 9, 2020

(30) Foreign Application Priority Data
Dec. 26, 2016 (CN) .......................... 201611215889.0

(51) Int. Cl.
F24F 11/30 (2018.01)
F24F 11/62 (2018.01)
(Continued)

(52) U.S. Cl.
CPC .............. *F24F 11/30* (2018.01); *F24F 11/58* (2018.01); *F24F 11/62* (2018.01); *F24F 11/72* (2018.01);
(Continued)

(58) Field of Classification Search
CPC .. F24F 11/30; F24F 11/62; F24F 11/72; F24F 11/58; F24F 2120/10; F24F 11/63;
(Continued)

(56) References Cited

U.S. PATENT DOCUMENTS 6,486,778 B2    11/2002  Mahler et al.
7,840,310 B2    11/2010  Orfield
(Continued)

FOREIGN PATENT DOCUMENTS

CN       104896656 A     9/2015
KR      20140088258 A    7/2014
(Continued)

OTHER PUBLICATIONS

International Search Report and Written Opinion for application PCT/US2017/067665, dated Mar. 26, 2018, 12 pages.
(Continued)

*Primary Examiner* — Charles R Kasenge
(74) *Attorney, Agent, or Firm* — Cantor Colburn LLP

(57) ABSTRACT

The present invention relates to device control for a predetermined area of space and belongs to the technical field of intelligent control of devices. A control system provided by the present invention comprises: a sensing component installed in the predetermined area of space and used for sensing the predetermined area of space to at least determine density information of living beings in the predetermined area of space, and an HVAC control and management unit of an HVAC system, wherein the sensing component is interactively connected with the HVAC control and management unit in a wireless communication mode, and the HVAC control and management unit is configured to control one or more air end devices at least based on the determined density information of living beings.

19 Claims, 6 Drawing Sheets

(51) Int. Cl.
*F24F 11/72* (2018.01)
*F24F 11/58* (2018.01)
*F24F 120/10* (2018.01)

(52) U.S. Cl.
CPC .. *F24F 2120/10* (2018.01); *G05B 2219/2642* (2013.01)

(58) Field of Classification Search
CPC .... F24F 11/56; F24F 2120/12; F24F 2120/14; G05B 2219/2642; G05B 15/02; G05B 19/418
See application file for complete search history.

(56) References Cited

U.S. PATENT DOCUMENTS

| | | | |
|---|---|---|---|
| 8,249,731 B2 | 8/2012 | Tran et al. | |
| 8,334,906 B2 | 12/2012 | Lipton et al. | |
| 8,457,796 B2* | 6/2013 | Thind | G05B 15/02 700/276 |
| 9,473,321 B1 | 10/2016 | Bazar et al. | |
| 10,607,147 B2* | 3/2020 | Raykov | G06N 7/005 |
| 2004/0245351 A1* | 12/2004 | Orfield | F24F 11/30 236/43 |
| 2006/0184325 A1* | 8/2006 | Orfield | F24F 11/62 702/1 |
| 2010/0235004 A1* | 9/2010 | Thind | G05B 15/02 700/277 |
| 2011/0066465 A1* | 3/2011 | Orfield | F24F 11/30 705/7.32 |
| 2012/0031984 A1* | 2/2012 | Feldmeier | F24F 11/30 236/49.3 |
| 2013/0073093 A1* | 3/2013 | Songkakul | G05B 15/02 700/276 |
| 2014/0207292 A1 | 7/2014 | Ramagem et al. | |
| 2014/0232516 A1 | 8/2014 | Stivoric et al. | |
| 2014/0277757 A1 | 9/2014 | Wang et al. | |
| 2014/0277763 A1 | 9/2014 | Ramachandran et al. | |
| 2015/0112885 A1 | 4/2015 | Fadell et al. | |
| 2015/0178865 A1* | 6/2015 | Anderson | G05B 17/02 705/7.25 |
| 2015/0185161 A1 | 7/2015 | Gettings et al. | |
| 2015/0204561 A1 | 7/2015 | Sadwick et al. | |
| 2016/0018119 A1 | 1/2016 | Desmet et al. | |
| 2016/0056629 A1 | 2/2016 | Baker et al. | |
| 2016/0133023 A1 | 5/2016 | Kaestle | |
| 2016/0146495 A1 | 5/2016 | Malve | |
| 2016/0261425 A1 | 9/2016 | Horton et al. | |
| 2016/0351043 A1* | 12/2016 | Tabe | G08B 25/14 |
| 2016/0377305 A1* | 12/2016 | Kwa | F24F 11/30 700/277 |
| 2017/0027045 A1* | 1/2017 | Chemel | H05B 47/105 |
| 2017/0100609 A1* | 4/2017 | Hsu | G08B 17/02 |
| 2017/0234562 A1* | 8/2017 | Ribbich | G05D 23/1923 700/277 |
| 2017/0364817 A1* | 12/2017 | Raykov | G06N 7/005 |
| 2018/0143601 A1* | 5/2018 | Chavan | F24F 11/62 |

FOREIGN PATENT DOCUMENTS

| | | |
|---|---|---|
| WO | 2014063201 A1 | 5/2014 |
| WO | 2015157670 A1 | 10/2015 |
| WO | 2016115230 A1 | 7/2016 |

OTHER PUBLICATIONS

Texas Instruments, "People Counting for Demand Controlled Ventilation Using 3D Time-of-Flight (ToF) Reference Design", TI Designs, Apr. 2016—Revised May 2016, 58 pgs.

* cited by examiner

CONTROL FOR DEVICE IN A PREDETERMINED SPACE AREA

TECHNICAL FIELD

The present invention belongs to the technical field of intelligent control of devices, and relates to control of one or more devices in a predetermined area of space based on density information of living beings in the predetermined area of space.

BACKGROUND ART

Various devices are usually installed in a predetermined area of space (such as meeting rooms and offices), wherein common devices are devices used for changing environmental conditions of the predetermined area of space to satisfy personnel environmental condition improvement demands in the predetermined area of space, such as air end devices of a Heating, Ventilation and Air Conditioning (HVAC) system, specifically such as Fan Coil Units (FCUs) and the like.

At present, air end devices such as FCUs in an area of space are actively and manually controlled by a person. For example, a plurality of FCUs in an area of space are manually adjusted and controlled through one or more thermostats, but cannot be adaptively and intelligently adjusted and controlled. Besides, thermostats and the like must be installed at corresponding positions in the area of space, are connected with FCUs in a wired mode, and transmit signals corresponding to manual adjustment and control to the FCUs depending on the wiring on walls, for example. Therefore, during installation of thermostats and the like, wiring is very troublesome and high-cost.

SUMMARY OF THE INVENTION

According to a first aspect of the present invention, a system for controlling a device in at least one predetermined area of space is provided, the device in the predetermined area of space comprising one or more air end devices of a Heating, Ventilation and Air Conditioning HVAC system installed in the predetermined area of space, the system comprising:

a sensing component installed in the predetermined area of space and used for sensing the predetermined area of space to at least determine density information of living beings in the predetermined area of space; and an HVAC control and management unit of the HVAC system;

wherein the sensing component is interactively connected with the HVAC control and management unit in a wireless communication mode, and the HVAC control and management unit is configured to control the one or more air end devices at least based on the determined density information of living beings.

According to a second aspect of the present invention, a method for controlling a device in at least one predetermined area of space is provided, the device in the predetermined area of space comprising one or more air end devices of a Heating, Ventilation and Air Conditioning HVAC system installed in the predetermined area of space, the method comprising the following steps:

sensing the predetermined area of space through a sensing component installed in the predetermined area of space;

at least determining density information of living beings in the predetermined area of space; and under a situation that an interactive connection is established between the sensing component and an HVAC control and management unit of the HVAC system in a wireless communication mode, controlling the one or more air end devices at least based on the determined density information of living beings, wherein the HVAC control and management unit is connected with the one or more air end devices.

According to a third aspect of the present invention, an HVAC control and management unit of an HVAC system is provided, the HVAC control and management unit comprising:

a wireless receiving unit used for wirelessly receiving density information of living beings in a predetermined area of space sent by a sensing component interactively connected with the wireless receiving unit; and a control signal generation unit configured to generate a first end device control signal at least based on the determined density information of living beings.

According to a fourth aspect of the present invention, a sensing component is provided, the sensing component being installed in a predetermined area of space and capable of being interactively connected with an HVAC control and management unit of a Heating, Ventilation and Air Conditioning HVAC system, the sensing component comprising:

a sensing unit used for sensing the predetermined area of space to at least determine density information of living beings in the predetermined area of space; and a wireless sending unit used for wirelessly sending at least the density information of living beings to the corresponding HVAC control and management unit.

According to the description and drawings below, the above-mentioned features and operations of the present invention will be more obvious.

BRIEF DESCRIPTION OF THE DRAWINGS

The above-mentioned and other purposes and advantages of the present invention will be more complete and clear from the following detailed description taken in conjunction with the drawings, in which the same or similar elements are represented by the same reference signs.

DETAILED DESCRIPTION

Figure 1:
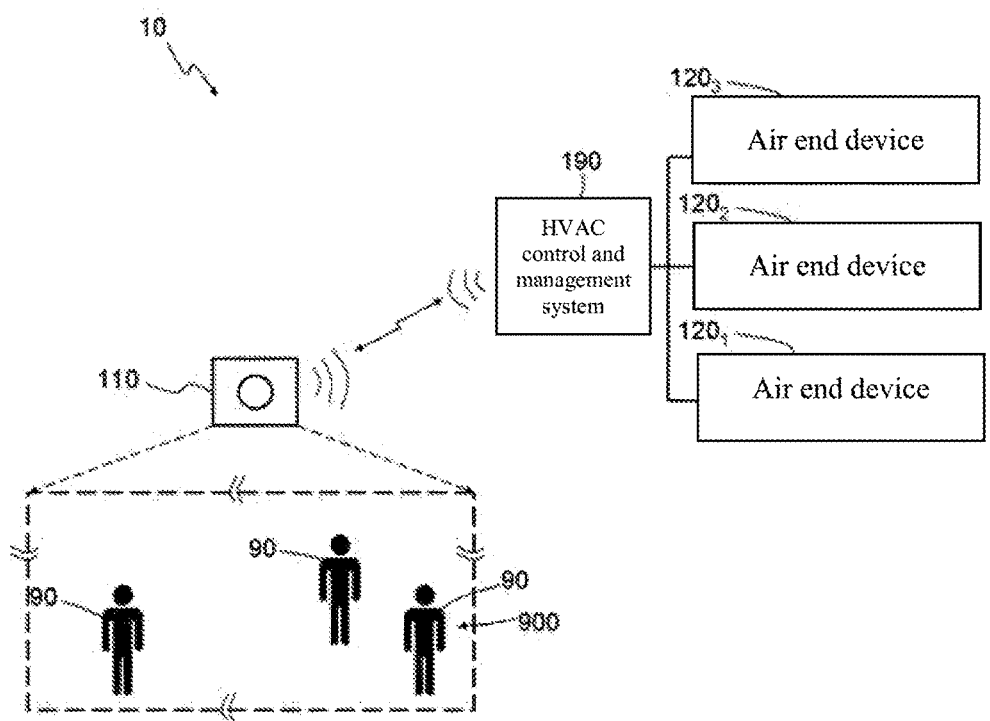
FIG. 1 is a structural schematic diagram of modules of a control system according to one embodiment of the present invention, wherein the control system is used for controlling a device in a predetermined area of space.

The present invention will be described more completely with reference to the drawings now. The drawings illustrate exemplary embodiments of the present invention. However, the present invention may be implemented in many different modes, and shall not be understood as limited to the embodiments described herein. Contrarily, these embodiments are provided, such that the present disclosure is thorough and complete, and the concept of the present invention is fully conveyed to the one skilled in the art.

Some block diagrams illustrated in the drawings (such as block diagrams except that of air end devices, sensing components and sensors) are functional entities, and do not necessarily have to correspond to physically or logically independent entities. It will be understood that these functional entities (such as partial block diagrams in air end devices and sensing components) may be implemented by means of software, or implemented in one or more hardware modules or integrated circuits, or implemented in different processing devices and/or microcontroller devices.

It needs to be stated that, in this text, "wireless communication mode" refers to an information transmission mode for transmitting signals independently of an arrangement of wires, and is not limited to a mode for transmitting signals through wireless carriers in a certain frequency range (such as WiFi and Bluetooth), for example, it may also be a wireless signal transmission mode based on optical signals (such as a visible light communication mode based on Morse code principle).

In the following embodiments, description is made by specifically taking the control of FCUs of an HVAC system installed in a predetermined area of space as an example. Under the following exemplary teachings, one skilled in the art could extensively apply the control system to dynamically and intelligently control other types of indoor air end devices (such as VAV air end devices, VAR air end devices) of the HVAC system in the predetermined area of space or other devices (such as illumination components and projectors) in the predetermined area of space.

A control system, a sensing component, an HVAC control and management unit and specific control methods according to the embodiments of the present invention will be specifically described below with reference to FIGS. 1-4.

As illustrated in FIG. 1, a control system 10 is used for controlling devices in a predetermined area of space 900, e.g., achieving dynamical and intelligent control of a plurality of air end devices 120 in the predetermined area of space 900, such that people 90 in the predetermined area of space 900 have better environmental conditions (such as more suitable temperature, air volume and humidity).

In this text, "predetermined area of space" may an area of space tangibly defined mainly by physical components such as wall bodies, for example, it may be but not limited to a certain office, a meeting room, a canteen, a cinema or a shopping mall in a building, and may also be but not limited to an elevator car, a vehicle carriage (such as a subway carriage) or the like; and "predetermined area of space" may also be a relatively open area of space which is intangibly defined, and for example, it may be but not limited to an area of space continuously formed by areas of space which can be accurately sensed by a plurality of adjacent sensing components. It shall be understood that the predetermined area of space can be subjectively defined by a user of the control system, wherein the user can define different specific predetermined areas of space according to specific application scenarios. The predetermined area of space does not necessarily have clear boundary areas illustrated in FIG. 1 and FIG. 2.

Figure 2:
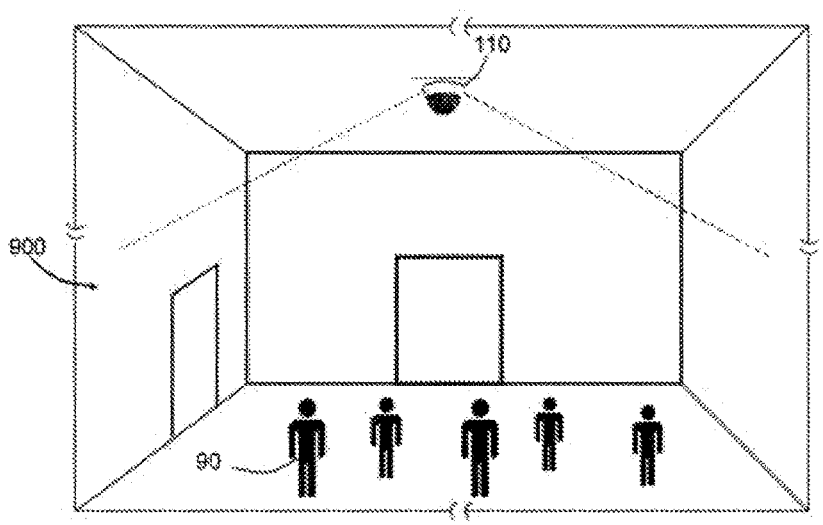
FIG. 2 is a schematic view of sensing performed by a sensing unit installed in a predetermined area of space according to one embodiment of the present invention.

The control system 10 as illustrated in FIG. 1 and FIG. 2 mainly comprises sensing components 110. FIG. 1 exemplarily illustrates one sensing component 110 in the predetermined area of space 900. It shall be understood that, according to the size of the predetermined area of space 900 and the size of the area which can be sensed by the sensing component 110 and the like, different numbers of sensing components 110 as illustrated in FIG. 1 may be installed in the predetermined area of space 900. For example, if the size of the area which can be sensed by the sensing component 110 is 3 m*3 m and the size of the predetermined area of space 900 is 9 m*9 m, then nine sensing components 110 need to be uniformly installed in the predetermined area of space.

Figure 3:
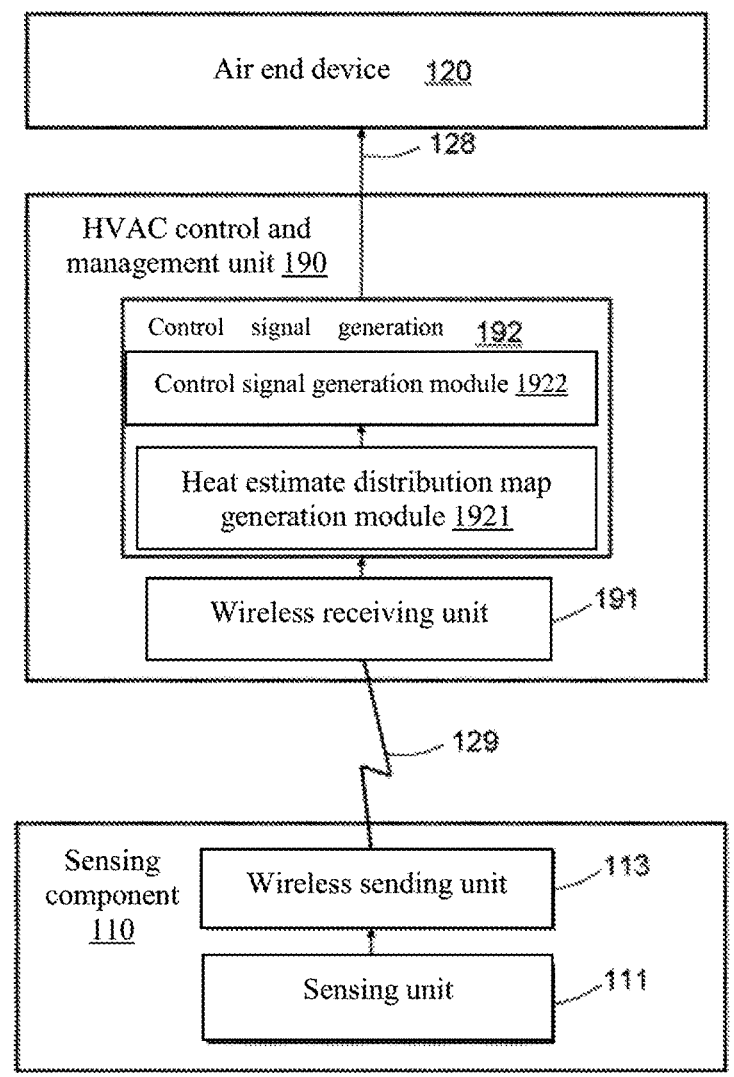
FIG. 3 is a structural schematic diagram of modules of a sensing component and an HVAC control and management unit according to one embodiment used in the control system according to the embodiment in FIG. 1.
Figure 5:
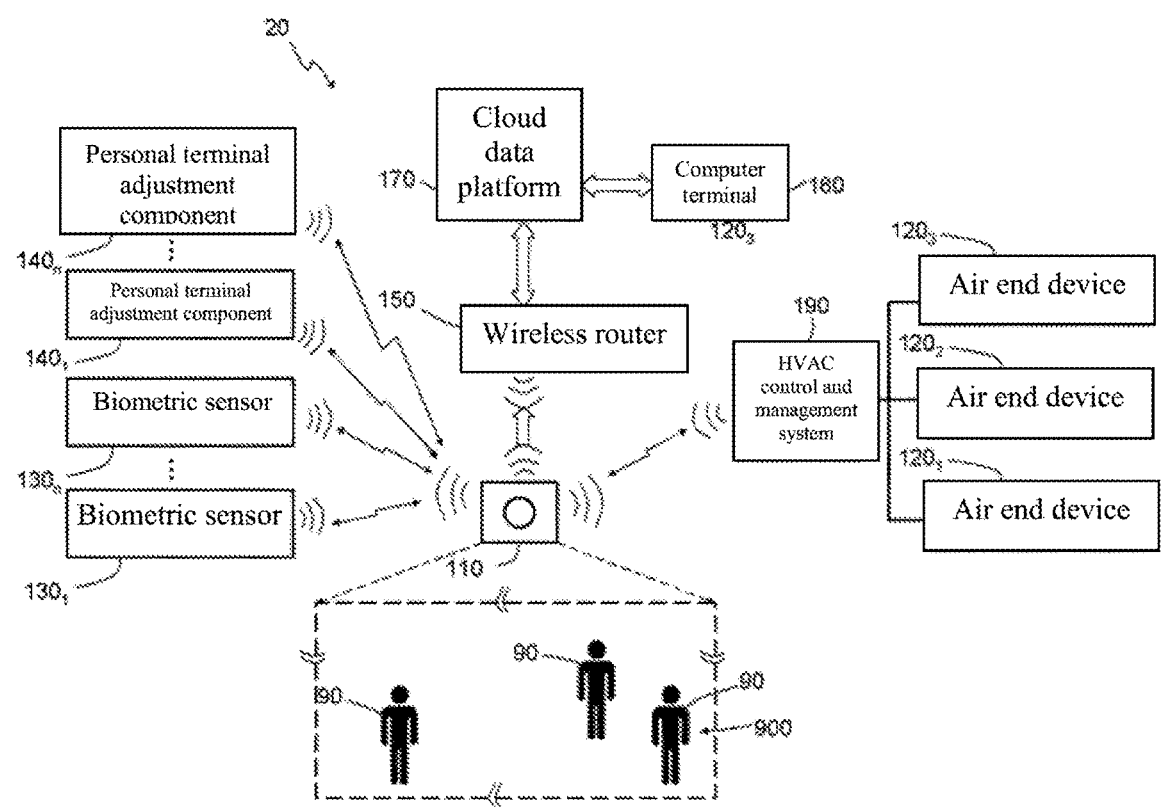
FIG. 5 is a structural schematic view of modules of a control system according to another embodiment of the present invention, wherein the control system is used for controlling a device in a predetermined area of space.

As illustrated in FIG. 2, one or more sensing components 110 may separately or jointly sense people 90 or other living beings (such as various raised animals in farms and zoos) in approximately all areas of the predetermined area of space 900. An installation mode of the sensing component 110 in the predetermined area of space 900 is not limited. The sensing component 110 is also not limited to being installed at a certain fixed position as illustrated in FIG. 2. For example, a plurality of sensing units (as illustrated in FIG. 3 and FIG. 5) of the sensing component 110 may be distributed and installed at a plurality of fixed positions in the predetermined area of space 900 to carry out real-time sensing and wirelessly and intensively send data to a processing component of the sensing component 110 to perform data processing.

Continuously as illustrated in FIG. 1, in the control system 10, three air end devices $120_1$, $120_2$ and $120_3$ (such as three FCUs) arranged in the predetermined area of space 900 in the HVAC system are exemplarily provided. Each of the air end devices 120 is connected with an HVAC control and management unit 190 in the HVAC system and can receive a control command signal sent thereto. For example, the air end devices 120 are connected with the HVAC control and management unit 190 in a wired mode or a wireless communication mode. The HVAC control and management unit 190 is interactively connected with the sensing component 110 in a wireless communication mode such as WiFi and Bluetooth. The HVAC control and management unit 190 is not limited to only controlling the air end devices in the predetermined area of space 900, but possibly a plurality of predetermined areas of space 900 share one HVAC control and management unit 190, i.e., possibly a plurality of sensing components 110 of a plurality of predetermined areas of space 900 are interactively connected with the same HVAC control and management unit 190 in a wireless mode. The specific installation configuration and position of the HVAC control and management unit 190 are not limited. The HVAC control and management unit 190 may be installed at any position where wireless signals sent by the sensing components 110 can be received, for example, the HVAC control and management unit 190 is installed at a position in a certain floor of a building or installed on a certain air end device 120.

In this embodiment, information of specific installation positions of the three air end devices $120_1$, $120_2$ and $120_3$ in the predetermined area of space 900 may be obtained upon installation. The installation position of each air end device 120 may be respectively recorded and stored in the HVAC control and management unit 190 of each air end device 120. Each air end device 120 in the predetermined area of space 900 may be identified through a two-dimensional code or the like, and the two-dimensional code information of each air end device 120 may be correspondingly associated with the installation position information thereof.

It can be seen that each air end device 120 is interactively connected with the sensing component 110 without depending on wires disposed on walls, for example. Described interactive connection mode is obviously different from an existing mode of interactive connection between air end devices such as FCUs and thermostats realized through wires on walls, and thereby in-situ wiring by grooving on wall bodies and the like can be avoided. Therefore, on one hand, the air end devices 120 and the sensing component 110 can be more easily installed, and on the other hand, wiring is avoided and the cost is greatly reduced.

FIG. 3 illustrates a structural schematic diagram of modules of a sensing component 110 and the HVAC control and management unit 190 according to one embodiment used in the control system according to the embodiment in FIG. 1. In this embodiment, a control signal generation unit 192 is integrally disposed in the HVAC control and management unit 190, and the HVAC control and management unit 190 can directly send an end device control signal 128 (such as an FCU control signal) to the air end devices 120 to control a corresponding air end device 120.

As illustrated in FIG. 3, one or more sensing units 111 are provided in the sensing component 110, and the sensing units 111 are used for obtaining density information of people in the predetermined area of space 900. According to the shape of the predetermined area of space 900 and the size of the area which can be sensed by each sensing unit 111 and the like, a plurality of sensing units 111 of one sensing component 110 or a plurality of sensing components 110 may be respectively installed and provided at different positions of the predetermined area of space 900. In an example where the predetermined area of space 900 is a certain meeting room, the sensing units 111 of the plurality of sensing components 110 may be installed on a ceiling of the meeting room in a uniformly distributed manner to acquire information of people in the meeting room.

It needs to be stated that, under a situation that there are only people in the predetermined area of space 900, the density information of living beings are only expressed as density information of people. However, if there are other animals in the predetermined area of space 900, the density information of living beings may be expressed as density information of all living beings. The following description is made only by taking that the density information of living beings is density information of people as an example.

The sensing units 111 may use various existing sensor components which can sense and determine information of people and perform calculation to obtain density information of people, or may also be various novel components which will emerge in future and can obtain the density information of people in the predetermined area of space 900 by means of sensing. In one embodiment, the sensing units 111 are visual sensors which can obtain image frames in the predetermined area of space 900 in real time and perform image processing to obtain current density information of people by means of analysis. In other embodiments, the sensing units 111 may be depth information sensors which can obtain depth information of a corresponding area by means of real-time sensing. An analysis processing component of the depth information sensors can process the depth information in real time, e.g., can extract information of people in the corresponding area (such as number information of people in the corresponding area) according to depth characteristic information, thereby obtaining the density information of people in the corresponding area through calculation. The density information of people is used for forming the density information of people of the sensing components 110, and subsequently is used as a data basis for controlling the air end devices 120. The depth information sensors do not acquire image information of people in a monitored area, which is beneficial to protect the privacy of people and avoids a complex image processing process, making it simpler to acquire data of density information of people. In other embodiments, the sensing units 111 may also be a combination of visual sensors and depth information sensors, and image information and depth information acquired by them may be used together herein to at least obtain the density information of people.

In one embodiment, the sensing units 111 may be Time-of-Flight (ToF) sensors which can sense three-dimensional data of a corresponding area of space. Whether objects have three-dimensional body figure characteristic information of people can be determined based on the three-dimensional data information, thereby information of people can be obtained through detection and relatively accurate three-dimensional body figure information of people can be obtained, and position information of people in the entire three-dimensional space can be further obtained simultaneously and thus density information of people can be rapidly calculated. ToF sensors can even track movement of people, e.g., track movement of people to determine people who enter or leave the predetermined area of space 900, so as to dynamically obtain a change in the density information of people in the predetermined area of space 900.

The density information of people may specifically include average density information of people and density distribution information of people, wherein the average density information of people reflects an average population density in the predetermined area of space 900. Under a situation that a plurality of air end devices 120 are provided in one predetermined area of space 900, all air end devices 120 may be controlled based on the same density distribution information of people. In other words, at this moment, all air end devices 120 in the same predetermined area of space 900 possibly receive the same end device control signal 128, such as the same temperature setting and the same air volume setting. The density distribution information of people reflects different distributions of population density in the predetermined area of space 900. For example, density distributions of people in different regions in a meeting room sensed by the sensing units 111 may be reflected through the density distribution information of people, and thereby the air end devices 120 corresponding to different regions may receive different end device control signals 128, such as different air speeds and air volumes. Under a situation that the sensing units 111 are ToF sensors, for example, ToF sensors may track movement information of people in the predetermined area of space 900, and thereby the change in the density distributions of people in different areas may be dynamically calculated in real time.

It needs to be stated that the specific types of the sensing units 111 are not limited to the types as described in the above-mentioned embodiments, and may also be other infrared sensors and the like, for example. The sensing units 111 are also not limited to acquiring or obtaining the density information of people in the above-mentioned embodiments, and may also obtain other types of information such as number of people and body figure of people, for example, or may also acquire other types of density-related information of people.

Continuously as illustrated in FIG. 3, the sensing component 110 is further provided with a wireless sending unit 113. The wireless sending unit 113 wirelessly sends the density information 129 of people in the form of a wireless signal. Correspondingly, the HVAC control and management unit 190 is provided with a wireless receiving unit 191 used for receiving the density information 129 of people. When a plurality of air end devices 120 are correspondingly provided in the predetermined area of space 900 in which one sensing component 110 is provided, the density information 129 of people is sent to one or more HVAC control and management units 190 correspondingly connected with the plurality of air end devices 120.

Correspondingly, in this embodiment, as illustrated in FIG. 3, the HVAC control and management unit 190 is further provided with a control signal generation unit 192. The control signal generation unit 192 obtains and performs data analysis processing on at least the received density information of people, so as to generate the end device control signal 128 at least based on the density information of people. Specific algorithms for data analysis processing are not limited, and the algorithm rules being followed may also be different according to different application places, different user demands, climate regulation of different areas, etc. For example, when the density information of people in the predetermined area of space 900 reflects that the number of people in the predetermined area of space is continuously zero within a certain period of time, the end device control signal 128 for turning off the air end devices 120 may be generated; or when the density information of people in the predetermined area of space 900 reflects that the number of people in the predetermined area of space is continuously greater than or equal to zero within a certain period of time, the end device control signal 128 for turning on the air end devices 120 may be generated, and the end device control signal 128 comprises instructions for setting air volume, temperature, humidity and the like of the air end devices 120 to initial setting values; or when the density information of people in the predetermined area of space 900 reflects that the number of people in the predetermined area of space is continuously greater than or equal to a predetermined value within a certain period of time, which indicates that a crowding degree in the predetermined area of space increases, the end device control signal 128 for adjusting and changing the air end devices 120 from the initial state may be generated, and the end device control signal 128 enables initial setting values of air volume, temperature, humidity and the like of the air end devices 120 to respectively change to certain values.

In an example where the end device control signal 128 is an air volume control signal, with the continuous increase of the density of people 90, the air volume in the end device control signal 128 continuously increases, otherwise, the air volume continuously decreases. Therefore, the HVAC control and management unit 190 in the embodiment of the present invention can dynamically control the air end devices 120 based on the predetermined area of space 900, this replaces the function of the traditional thermostats disposed on wall bodies. This being the case, the installation and configuration of the thermostats can be avoided, the wiring engineering on wall bodies is advantageously avoided, the cost is reduced, the air end devices 120 in the predetermined area of space 900 can be automatically and adaptively controlled, the user experience is good, and relatively comfortable environmental conditions can be easily obtained.

In one embodiment, the control signal generation unit 192 generates a plurality of different end device control signals 128 based on the density distribution information of people in the density information of people. Specifically, the control signal generation unit 192 comprises a heat estimate distribution map generation module 1921 and a control signal generation module 1922. The density distribution information of people of the sensing units 111 is sent to the heat estimate distribution map generation module 1921. The heat estimate distribution map generation module 1921 generates a heat estimate distribution map of the predetermined area of space at least based on the density distribution information of people. In a generation process of the heat estimate distribution map, the heat estimate distribution map may be generated corresponding to the density distribution information of people, wherein the heat distribution estimate is higher in the area with larger density of people, and otherwise, the heat distribution estimate is lower. Therefore, the heat estimate distribution map reflecting the heat distribution in the predetermined area of space 900 can be generated in a relatively accurate manner. As compared with the traditional method for generating a heat distribution in a determined area only depending on carbon dioxide sensors, not only is the accuracy higher, but also the cost is lower.

The control signal generation module 1922 generates a plurality of different end device control signals 128 based on heat distribution differences between different subareas in the heat estimate distribution map. In an example where the predetermined area of space 900 is a large meeting room, a population density distribution difference between different subareas is possibly great, and the heat estimate distribution map may reflect this difference and a difference in environmental conditions within the meeting room caused by this difference. In a process of generating the end device control signals 128, analysis processing may be performed on the data of the heat estimate distribution map, and corresponding different subareas A, B, C and the like are divided. Different subareas have different heat conditions (caused by the difference in density of people), and different end device control signals 128 such as different temperatures/air volume settings are respectively generated corresponding to different subareas A, B and C. Thereby, distinguished control of the air end devices 120 in different subareas of the same predetermined area of space can be automatically realized, such that people in different subareas of the predetermined area of space can obtain the experience of comfortable environmental conditions, and the situations that the environmental condition of the subarea with fewer people is too cold and the environmental condition of the subarea with more people is too stuffy are prevented from occurring.

It needs to be stated that, since the heat estimate distribution map may dynamically vary with the change of people, the plurality of different end device control signals 128 generated based on this may also correspondingly and dynamically vary.

When the end device control signals 128 generated by the control signal generation unit 192 for a certain predetermined area of space 900 are the same, the HVAC control and management unit 190 sends the end device control signals 128 to the air end devices 120 corresponding to the predetermined area of space 900. When the end device control signals 128 generated by the control signal generation unit 192 for a certain predetermined area of space 900 are a plurality of different end device control signals 128, the HVAC control and management unit 190 respectively sends the plurality of different end device control signals 128 to the air end devices 120 at different positions according to the recorded position information of the plurality of air end devices 120, e.g., respectively and correspondingly sends the different end device control signals 128 to the air end devices 120 in the subareas A, B and C according to the position information of the air end devices 120 in the subareas A, B and C (the position information may be reflected through address information).

The air end devices 120, after receiving the corresponding end device control signals 128, may perform processing such as conversion to obtain corresponding control instructions, and thereby the air end devices 120 are driven to operate based on the control instructions.

The control system 10 in the above-mentioned embodiments can better replace the function of the existing thermostats, reduce the installation cost of the thermostats, especially the wiring cost, and can adaptively adjust and control the air end devices such as FCUs according to the change of people in the predetermined area of space. This being the case, the people in the predetermined area of space can automatically obtain better environmental conditions in time and the experience is better. Besides, when the sensing components 110 or the like are required to be updated and maintained, maintenance devices may be wirelessly connected with the sensing components 110 to facilitate updating and maintenance.

It shall be understood that the intelligent control functions of the control system 10 are not limited to the form of the above-mentioned examples, more types of adaptive intelligent control functions may be implemented with the progress of functions of real-time sensing and data analysis which can be implemented by the used sensing units 111. For example, when the sensing units 111 can further acquire body figure data of each person in real time, whether the people 90 are in a sleep and rest state may be determined based on the body figure data (e.g., most people are sleeping at noon in a noon sleeping period of time in an office), and the control signal generation unit 192 may generate end device control signals for reducing air volume and the like based on the analysis result of the sensing units 111, so as to reduce noise and allow people to rest more comfortably at current.

Figure 4:
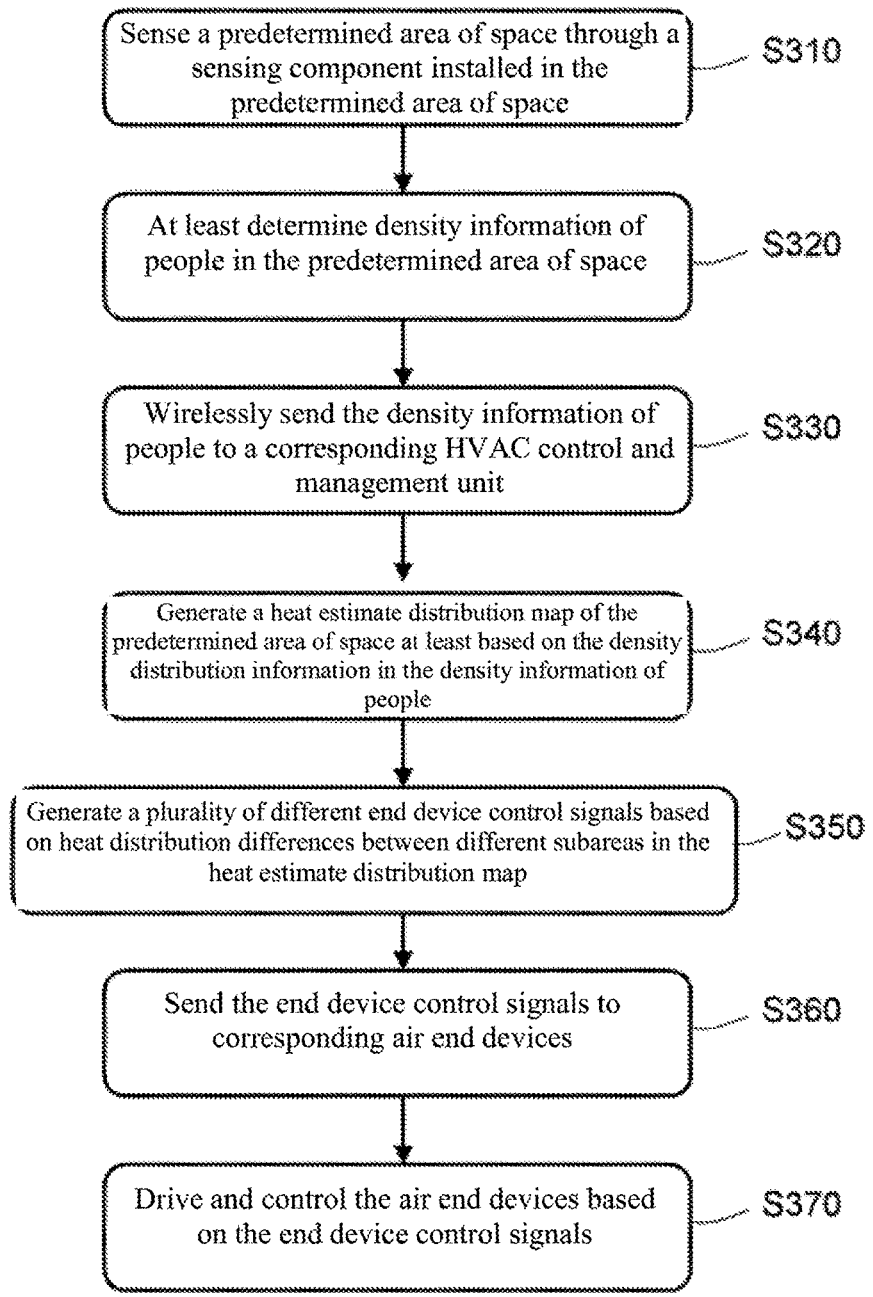
FIG. 4 is a flowchart schematic of a control method according to one embodiment used in the control system according to the embodiment in FIG. 1.

A flowchart schematic of a control method according to one embodiment of the present invention are described below with reference to FIG. 3 and FIG. 4.

Firstly, in step S310, a predetermined area of space is sensed through a sensing component installed in the predetermined area of space.

In step S320, density information of people in the predetermined area of space is at least determined. This step may be completed by one or more sensing units 111 provided in the sensing component 110. For specific methods and principles of obtaining the density information of people, refer to the exemplary description about the sensing units 111 above. In one embodiment, the density information of people further comprises density distribution information of people, which may be acquired simultaneously in a process of obtaining the above-mentioned density information of people by means of calculation.

Further, in step S330, the density information of people is wirelessly sent to a corresponding HVAC control and management unit 190. The density information of people of one sensing component 110 may be sent to an HVAC control and management unit 190 connected with a plurality of corresponding air end devices 120.

Further, in step S340, a heat estimate distribution map of the predetermined area of space is generated at least based on density distribution information in the density information of people. A heat estimate distribution map generation module 1921 of a control signal generation unit 192 generates a heat estimate distribution map of the predetermined area of space at least based on the density distribution information of people. In the generation process of the heat estimate distribution map, the heat estimate distribution map may be generated corresponding to the density distribution information of people, wherein the heat distribution estimate is higher for the area with a larger density of people, and otherwise, the heat distribution estimate is lower.

Further, in step S350, a plurality of different end device control signals are generated based on heat distribution differences between different subareas in the heat estimate distribution map. This step is completed by a control signal generation module 1922 of the control signal generation unit 192. For specific generation methods and principles, refer to the exemplary description about the control signal generation unit 192 above.

Further, in step S360, the end device control signals are sent to corresponding air end devices. When one sensing component 110 corresponds to a plurality of air end devices 120 and the end device control signals 128 are the same, the HVAC control and management unit 190 sends the same end device control signal 128 to all of the plurality of air end devices 120; and when one sensing component 110 corresponds to a plurality of air end devices 120 and the end device control signals 128 are correspondingly different, the HVAC control and management unit 190 may respectively send the plurality of different end device control signals 128 to air end devices 120 at different positions according to the recorded position information of the plurality of air end devices 120.

Further, in step S370, the air end devices are driven and controlled based on the end device control signals.

Up to now, one process of the method for dynamically and adaptively controlling the air end devices 120 in the predetermined area of space 900 is basically ended. With the change of the density of people data sensed by the sensing units 111, the above-mentioned process of the control method may also be repeated to obtain different end device control signals 128 to realize dynamic control.

A control system 20, sensing component 110, air end devices 120 and specific control methods provided by the embodiments of the present invention are specifically described below with reference to FIGS. 5-8.

As illustrated in FIG. 5, the control system 20 is used for controlling a device in a predetermined area of space 900. Description will be made continuously by taking control of air end devices 120 of an HVAC system as an example. As compared with the control system 10 in the embodiment illustrated in FIG. 1, in addition to the similar sensing component 110, HVAC control and management unit 190 and air end devices 120 in the control system 10 illustrated in FIG. 1, the control system 20 further comprises several biometric sensors 130, such as n biometric sensors 130$_1$-130$_n$ (n≥2). The biometric sensors 130 are worn by people 90 in the predetermined area of space 900, so as to acquire biometric information of people 90 in real time and wirelessly sent it. Types of acquired biometric information are not limited, and may be at least one of body temperature, body surface humidity, heart rate, electrocardiogram and respiratory rate. It shall be understood that any biometric information which can reflect a change in environmental conditions in the predetermined area of space 900 may be acquired and sent. For example, the biometric information may further comprise blood pressure and the like. The biometric sensor 130 is correspondingly provided with a wireless sending unit, such that the acquired biometric information data may be wirelessly sent to a corresponding sensing component 110. The sensing component 110 may further wirelessly send the acquired biometric information data to the HVAC control and management unit 190. Specifically, the biometric sensors 130 may be implemented by means of wearable devices worn by people 90, such as smart wristbands and smart watches, and may be conveniently connected with the sensing component 110 in the predetermined area of space 900 in a mode such as Bluetooth, which is simple to implement.

Figure 6:
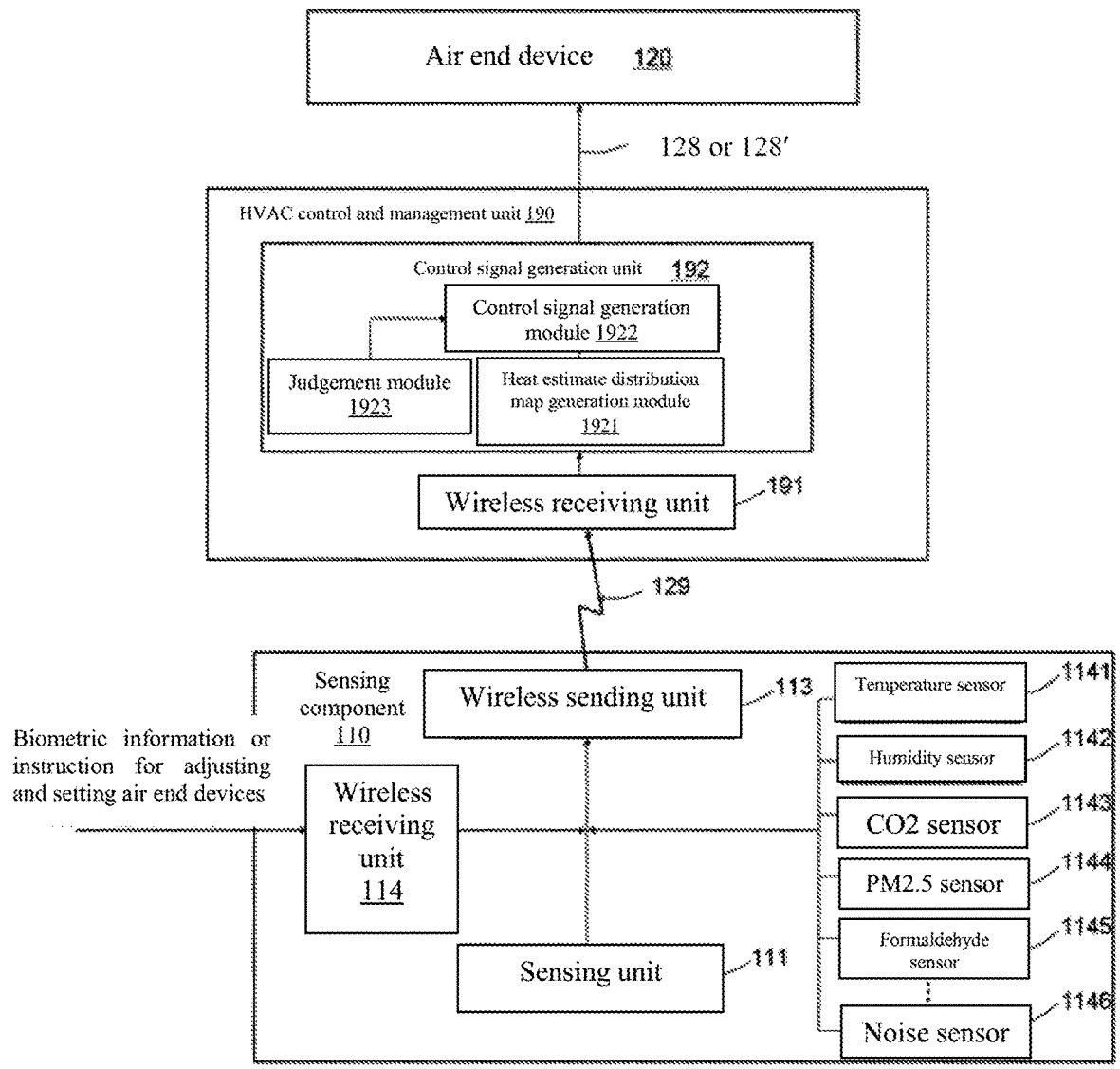
FIG. 6 is a structural schematic diagram of modules of a sensing component and an HVAC control and management unit according to one embodiment used in the control system according to the embodiment in FIG. 5.

The HVAC control and management unit 190 is further configured to receive the biometric information data sent by the biometric sensors 130, and adjust and change the end device control signal 128 based on the biometric information. In one embodiment, as illustrated in FIG. 6, as compared with the sensing component 110 illustrated in FIG. 3, the control signal generation unit 192 further comprises a wireless receiving unit 114 used for wirelessly receiving the biometric information sent by all biometric sensors 130 in the predetermined area of space. As compared with the HVAC control and management unit 190 illustrated in FIG. 3, the HVAC control and management unit 190 in FIG. 6 is further provided with a judgement module 1923. The biometric information sent by the biometric sensor 130 may be sent by the wireless sending unit 113 and may be received by the wireless receiving unit 191. Then the judgement module 1923 performs statistical analysis based on the predetermined biometric information. The control signal generation unit 192 is enabled to adjust and change the current end device control signal 128 only when more than a predetermined proportion of biometric sensors reflect that the current end device control signal 128 needs to be changed. Therefore, the control signal generation unit 192 may adjust and change the end device control signal 128 based on the biometric information, and generate a new end device control signal 128'. As an example, smart wristbands worn by people in the predetermined area of space 900 send body temperature and body surface humidity data. If the judgement module 1923 analyzes and reflects that more than a predetermined proportion of people 90 feel too hot, it indicates that the current environmental conditions of the predetermined area of space 900 are not suitable and need to be adjusted. Therefore, the judgement module 1923 may send a corresponding trigger signal to the control signal generation unit 192 to enable the control signal generation unit 192 to adjust and change the previously generated end device control signal 128, e.g., decrease temperature setting and increase air volume, so as to obtain a new end device control signal 128'. In this way, the air end devices 120 which operate under the driving of the new end device control signal 128' can provide an adjustment for relatively comfortable environments for most people and can easily satisfy the demands of most people.

The predetermined proportion may be selected and set from a range of 70%-90%, so as to avoid too frequent useless adjustment and change of the end device control signal. Specifically, the above-mentioned predetermined proportion may be set to 80%, which reflects that the end device control signal is adjusted and changed to change the operation of the end devices 120 only when up to 80% of people in the predetermined area of space 900 require changing the current environmental conditions.

Figure 7:
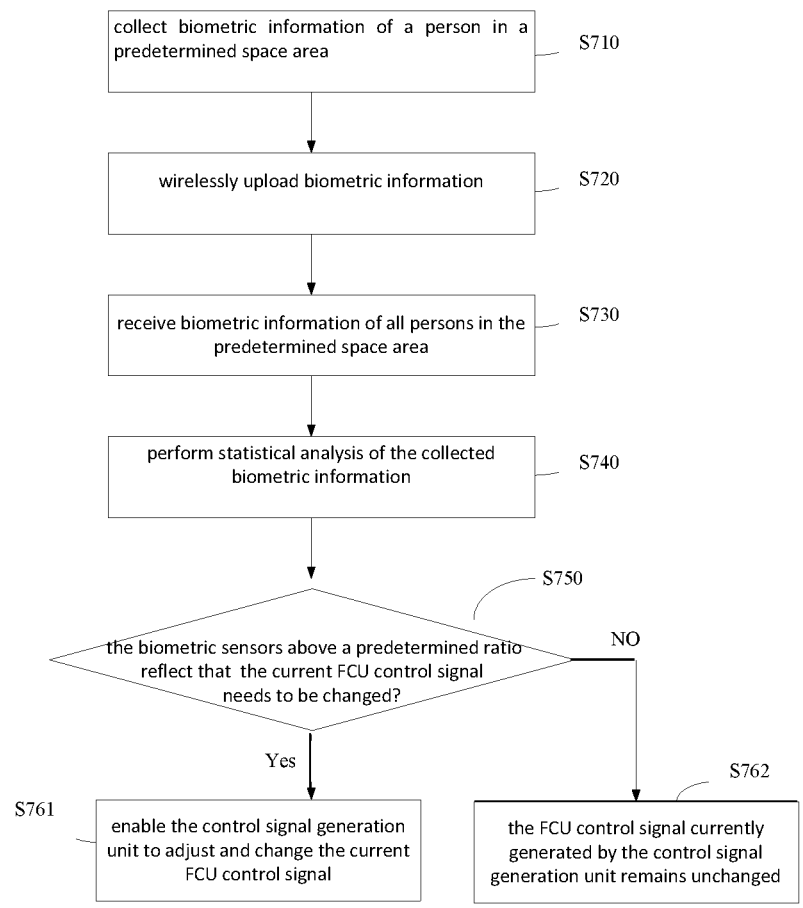
FIG. 7 is a flowchart schematic of a method for adjusting and changing an end device control signal according to one embodiment in the control method of the control system according to the embodiment in FIG. 5.

FIG. 7 illustrates a flowchart schematic of a method for adjusting and changing an end device control signal according to one embodiment in the control method of the control system according to the embodiment in FIG. 5. A process of the method for adjusting and changing the end device control signal is described below with reference to FIGS. 5-7.

Firstly, in step S710, biometric information of people in a predetermined area of space is acquired. In this step, the biometric information of people, such as at least one of body temperature, body surface humidity, heart rate, electrocardiogram and respiratory rate, is acquired in real time by biometric sensors 130 (such as wearable devices) provided corresponding to each person.

Further, in step S720, the biometric information is wirelessly sent. In this step, the biometric information acquired by each biometric sensor 130 is sent to a sensing component 110 which is connected with the biometric sensor 130 in a corresponding and wireless communication mode. If there are a plurality of sensing components 110 in one predetermined area of space 900, then the biometric sensors 130 may be wirelessly connected with the sensing component 110 at a relatively closer position and send the acquired biometric information to the sensing component 110.

Further, in step S730, all biometric information of people in the predetermined area of space is received and wirelessly sent to a corresponding HVAC control and management unit. In this step, all biometric information is received through a wireless receiving unit 114 in the sensing component 110. In addition, all received biometric information is forwarded to the corresponding HVAC control and management unit 190 through a wireless sending unit 113 in the sensing component 110. Therefore, the HVAC control and management unit 190 may receive all biometric information received by the plurality of sensing components 110 in the predetermined area of space 900.

Further, in step S740, statistical analysis is performed on the acquired biometric information. In this step, a judgement module 1923 performs statistical analysis on the biometric information, e.g., performs classification processing on different biometric information.

Further, in step S750, whether more than a predetermined proportion of biometric sensors reflect that a current end device control signal needs to be changed is determined. For example, if the judgement module 1923 determines that body temperature data acquired by the biometric sensors corresponding to 80% of people is greater than a predetermined value, it indicates that 80% of people (corresponding to the biometric sensors worn by people) reflect that the current end device control signal needs to be changed. If a judgement result is "Yes", the method proceeds to step S761 to enable the control signal generation unit to adjust and change the current end device control signal. Specifically, the current end device control signal 128 is adjusted and changed through a control signal generation module 1922 to generate an end device control signal 128' of a lower temperature, for example. If a judgement result is "No", the method proceeds to step S762 to keep the current end device control signal 128 generated by the control signal generation unit unchanged.

The above-mentioned step S710 to step S750 may be repetitively implemented, e.g., may be repetitively implemented at a predetermined time interval.

Continuously as illustrated in FIG. 5, as compared with the control system 10 in the embodiment illustrated in FIG.

1, in order to enable each person in the predetermined area of space 900 to be capable of actively adjusting and controlling the air end devices, the control system 20 may be further provided with several personal terminal adjustment components 140, such as n personal terminal adjustment components 140$_1$-140$_n$. (n≥2). The personal terminal adjustment components 140 are worn by people 90 in the predetermined area of space 900 to enable the people to conveniently adjust and set the air end devices. The personal terminal adjustment component 140 is also provided with a wireless sending module for wireless connection with the sensing component 110, such that an instruction for adjusting and setting the air end devices input by each person (such as instructions for adjusting and setting FCUs such as temperature increase and air volume increase) can be sent to the sensing component 110. In one embodiment, the personal terminal adjustment components 140 may be implemented by means of wearable devices (such as smart watches) worn by people 90, portable intelligent terminals (such as smart phones), etc. Specifically, the personal terminal adjustment component 140 and the above-mentioned biometric sensor 130 may be implemented in one wearable device (such as smart wristband and smart watch), which is simple to implement and does not increase the additional hardware cost. For example, a corresponding APP may be installed in a smart watch to realize a function that the personal terminal adjustment component 140 inputs an instruction for adjusting and setting the air end devices, which is convenient to operate.

Continuously as illustrated in FIG. 6, the HVAC control and management unit 190 is further configured to receive the instruction for adjusting and setting the air end devices sent by the personal terminal adjustment components 140, and adjust and change the current end device control signal 128 based on the instruction for adjusting and setting the air end devices. In one embodiment, as illustrated in FIG. 6, the wireless receiving unit 114 of the sensing component 110 is further used for wirelessly receiving the instructions for adjusting and setting the air end devices sent by all personal terminal adjustment components 140 in the predetermined area of space. Then the instructions for adjusting and setting the air end devices may be sent by the wireless sensing unit 113, and received by the wireless receiving unit 191 of the HVAC control and management unit 190. The judgement module 1923 of the HVAC control and management unit 190 further performs statistical analysis based on the received plurality of instructions for adjusting and setting the air end devices. The control signal generation unit 192 is enabled to adjust and change the current end device control signal 128 only when more than a predetermined proportion of personal terminal adjustment components 140 reflect that the current end device control signal 128 needs to be changed. Therefore, the control signal generation unit 192 may adjust and change the end device control signal 128 based on the instruction for adjusting and setting the air end devices, and generate a new end device control signal 128'. For example, if people in the predetermined area of space 900 input the instruction for adjusting and setting the air end devices from smart watches they are wearing, in an example where the instruction aims at temperature setting (the instruction for adjusting and setting the air end devices may be subjected to instruction classification processing in the judgement module 1923), if the judgement module 1923 analyzes and reflects that more than a predetermined proportion of people input an instruction for increasing temperature, it indicates that the temperature of the current environmental condition of the predetermined area of space 900 is too low. Therefore, the judgement module 1923 may send a corresponding trigger signal to the control signal generation unit 192 to enable the control signal generation unit 192 to adjust and change the previously generated end device control signal 128, e.g., increase a certain temperature value, so as to obtain a new end device control signal 128'. In this way, the air end devices which operate under the driving of the new end device control signal 128' can provide an adjustment for relatively comfortable environments to most people, and can easily satisfy the demands of most people. In addition, the control system 20 can better realize the function of active adjustment of traditional thermostats, also avoid the problem caused for a reason that the same thermostat is randomly adjusted and set by different people, and better reflect effective subjective demands of most people in the predetermined area of space 900.

Similarly, the above-mentioned predetermined proportion may be selected and set from a range of 70%-90%, avoiding too frequent useless adjustment and change of the end device control signal. Specifically, the above-mentioned predetermined proportion may be set to 80%, which reflects that the end device control signal is adjusted and changed to change the operation of the air end devices 120 only when 80% of people in the predetermined area of space 900 require adjusting and setting the current environmental conditions. In this way, the effective subjective demands of most people in the predetermined area of space 900 can be better and accurately reflected.

Figure 8:
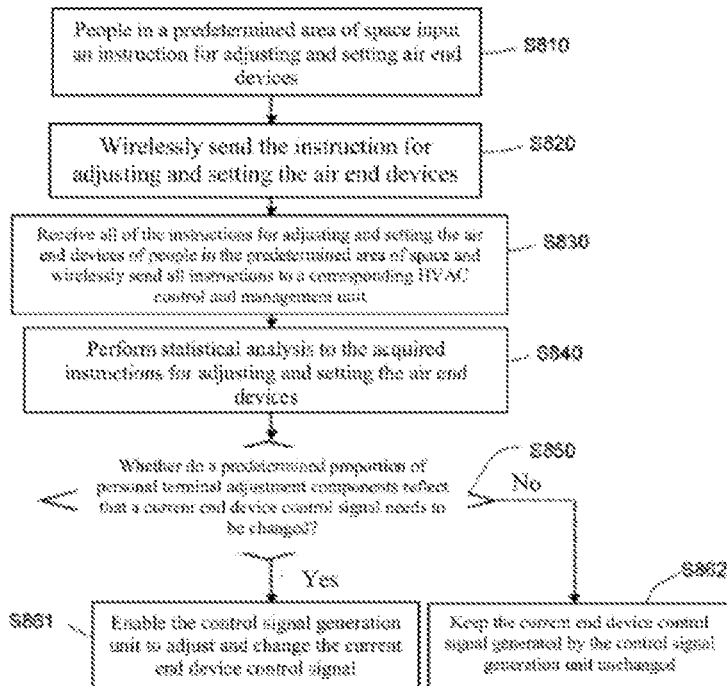
FIG. 8 is a flowchart schematic of a method for adjusting and changing an end device control signal according to another embodiment in the control method of the control system according to the embodiment in FIG. 5.

FIG. 8 illustrates a flowchart schematic of a method for adjusting and changing an end device control signal according to another embodiment in the control method of the control system according to the embodiment in FIG. 5. A process of the method for adjusting and changing the end device control signal is described below with reference to FIG. 5, FIG. 6 and FIG. 8.

Firstly, in step S810, people in a predetermined area of space input an instruction for adjusting and setting air end devices. In this step, each person may input the instruction for adjusting and setting air end devices, such as increasing temperature, decreasing temperature and increasing air volume, through a personal terminal adjustment component 140 (such as a wearable device).

Further, in step S820, the instruction for adjusting and setting the air end devices is wirelessly sent. In this step, the instruction for adjusting and setting the air end devices input by each personal terminal adjustment component 140 is sent to a sensing component 110 connected thereto in a corresponding and wireless communication mode. If there are a plurality of sensing components 110 in one predetermined area of space 900, the personal terminal adjustment components 140 may be wirelessly connected with the sensing component 110 at a relatively closer position, and send the input instruction for adjusting and setting the air end devices (if any) input by the personal terminal adjustment component to the sensing component 110.

Further, in step S830, all of the instructions for adjusting and setting the air end devices of people in the predetermined area of space are received and wirelessly sent to a corresponding HVAC control and management unit. In this step, all of the instructions for adjusting and setting the air end devices are received through a wireless receiving unit 114 in the sensing component 110. In addition, all the received instructions for adjusting and setting the air end devices are forwarded to the corresponding HVAC control and management unit 190 through a wireless sending unit 113 in the sensing component 110. Therefore, the HVAC control and management unit 190 may receive all of the instructions for adjusting and setting the air end devices received by a plurality of sensing components 110 in the predetermined area of space 900.

Further, in step S840, statistical analysis is performed on the acquired instructions for adjusting and setting the air end devices, e.g., classification processing is performed on different instructions for adjusting and setting the air end devices to obtain a statistical distribution of the instructions for adjusting and setting the air end devices.

Further, in step S850, whether more than a predetermined proportion of personal terminal adjustment components reflect that a current end device control signal needs to be changed is determined. For example, if the judgement module 1923 determines that the instructions of the personal terminal adjustment components corresponding to 80% of people are instructions for increasing temperature, it indicates that 80% of people (corresponding to the personal terminal adjustment components worn by people) reflect that the current end device control signal 128 needs to be changed. If a judgement result is "Yes", the method proceeds to step S861 to enable the control signal generation unit 192 to adjust and change the current end device control signal. If a judgement result is "No", the method proceeds to step S862 to keep the current end device control signal generated by the control signal generation unit 192 unchanged.

It needs to be stated that the above-mentioned methods of the instructions for adjusting and changing the air end devices in the embodiments illustrated in FIG. 7 and FIG. 8 may be simultaneously implemented. When a judgement result is "Yes" in any of step S750 and step S850, the current end device control signal 128 is adjusted and changed; and when judgement results are "Yes" in both of step S750 and step S850, if a certain type of control signal (such as temperature adjustment) is adjusted and changed differently, for example, the adjustment and change may be performed preferably based on step S861 to obtain the corresponding end device control signal 128'.

Continuously as illustrated in FIG. 6, in one embodiment, the sensing component 110 is further provided with an indoor environment sensor for monitoring environment parameters and the like in the predetermined area of space 900. Specifically, the indoor environment sensor may be but not limited to at least one of the following sensors: a temperature sensor 1141, a humidity sensor 1142, a carbon dioxide sensor 1143, a PM2.5 sensor 1144, a formaldehyde sensor 1145 and a noise sensor 1146. For example, the indoor environment sensor may also be at least one of a CO sensor, a TVOC sensor, a O3 sensor, a vibration sensor and a light sensor and other sensors. Data acquired by these sensors may also be transmitted to the control signal generation module 1922 of the HVAC control and management unit 190, so that the HVAC control and management unit 190 is configured to be capable of controlling the air end devices based on information acquired by the temperature sensor 1141, the humidity sensor 1142, the carbon dioxide sensor 1143, the PM2.5 sensor 1144, the formaldehyde sensor 1145 and/or the noise sensor 1146. For example, when the air end devices 120 are turned on, initial setting values of air volume, temperature, humidity and the like may be implemented based on the end device control signal generated based on the information acquired by them. For another example, the heat estimate distribution map generated in the above-mentioned embodiments may be corrected based on CO2 concentration data acquired by the carbon dioxide sensor 1143, so as to influence the generation of the end device control signal 128. For another example, the end device control signal for turning on or off a filter device may be generated based on pollutant concentration data such as PM2.5 acquired by the PM2.5 sensor 1144.

Continuously as illustrated in FIG. 5, in a wireless network of the control system 20, one or more sensing components 110 in the predetermined area of space 900 become key data acquisition or collection ends and become important or key network nodes, and they can not only sense and obtain density information of people and the like in real time, but also easily establish a wireless connection with the biometric sensors 130 and/or personal terminal adjustment components 140 in the predetermined area of space 900. In one embodiment, the control system 20 may also be provided with a wireless router 150 and a cloud data platform 170, so that each sensing component 110 wirelessly connected with the wireless router 150 may also send at least part of the acquired data (such as density information data of people acquired by the sensing component 110 in real time, the biometric information data received by the sensing component 110, and even data sent by the HVAC control and management unit 190 (such as operating state data of the air end devices 120 in the predetermined area of space 900)) to the cloud data platform 170 in real time or at a predetermined time interval through the wireless router 150. Therefore, the cloud data platform 170 may collect mass related historical data, which facilitates big data processing.

In one embodiment, several computer terminals 180 are connected with the cloud data platform 170. The computer terminals 180 may be various desktop computer devices and may also be portable computer devices or intelligent mobile terminals (such as smart phones), etc. The computer terminals 180 can download and obtain the density information of people and the like corresponding to one or more predetermined areas of space 900 in the cloud data platform 170 under a situation that the computer terminals 180 pass verification, and can not only acquire data such as current density information of people in the predetermined area of space 900 from a distal end, but also perform historical data statistical analysis on data such as the density information of people, which facilitates intelligent management of buildings and the like.

Certainly, it shall be understood that the computer terminals 180 can download and obtain other data in the cloud data platform 170 (such as biometric information data of the predetermined area of space 900 of a certain building), so as to perform historical data statistical analysis, such that the comfortable degree and the like of the building can be reflected.

It needs to be stated that the cloud data platform 170 is just one of implementation modes of the data management device of the control system 20, and can fully make good use of the advantages of cloud data. In other embodiments, the data management device may also be implemented by means of a data server which is centrally provided, e.g., a data server in a certain building receives data from all sensing component terminals in the building. It shall be understood that the specific implementation mode of the data management device is not limited.

FIGS. 1-8 exemplarily describe the control of the air end devices 120 in the predetermined area of space 900 above. It shall be understood as that the principle of controlling the air end devices 120 may be analogically applied to the control of other devices similar to the air end devices 120. In one embodiment, devices such as illumination components (not shown) are installed in the predetermined area of space 900. The illumination components are also interactively connected with the sensing components 110 illustrated in FIG. 1 and FIG. 5 in a wireless communication mode. The sensing components 110 are further configured to generate lamp light control signals based on the determined density data of people and wirelessly send the signals to the corresponding illumination components. For example, when the density information data of people is 0, it indicates that there are no people in the predetermined area of space 900, the control signal generation unit 192 of the sensing component 110 may generate a lamp light control signal for turning off the illumination components, and the illumination components can be automatically turned off. For another example, different lamp light control signals are generated according to the density distribution information of people to correspondingly control the illumination components in different subareas of the predetermined area of space 900.

In another embodiment, when the predetermined area of space 900 is a meeting room in which devices such as projectors or a meeting room booking system (not shown) are installed, the illumination components are also interactively connected with the sensing components 110 illustrated in FIG. 1 and FIG. 5 in a wireless communication mode. The sensing component 110 is further configured to generate a projector control signal according to the determined density data of people, and wirelessly send the signal to the corresponding projector such that the projector can be automatically turned on or off, or generate a signal indicating whether the meeting room has already been used and wirelessly send the signal to the meeting room booking system such that the meeting room booking system can be updated according to the signal indicating whether the meeting room has already been used when the meeting room is actually not used even though the meeting room is booked. If it is determined that the meeting room is not in use, the meeting room booking system may update the state to a "not booked" state in real time, this facilitates the high-efficiency use of the meeting room and prevents the meeting room from being occupied for no reason.

It needs to be stated that elements disclosed and described in this text (including the flowcharts and block diagrams in the drawings) refer to logical boundaries between elements. However, according to software or hardware engineering practice, the described elements and functions thereof may be executed on a machine through a computer-executable medium. The computer-executable medium has a processor capable of executing program instructions stored thereon. The program instructions are used as single-chip software structures, independent software modules, modules using external programs, codes, services and the like or any combinations thereof, and all of these execution solutions may fall into the scope of the present disclosure.

Although specifically described assemblies are provided in different nonrestrictive implementations, the implementations of the present invention are not limited to these specific combinations. Some of assemblies or features coming from any nonrestrictive implementations are possibly used to combine with the features or assemblies coming from any other nonrestrictive implementations.

Although specific step sequences are illustrated, disclosed and required, it shall be understood that the steps may be implemented, separated or combined according to any sequences. Unless otherwise clearly stated, it still benefits from the present disclosure.

The above-mentioned examples mainly describe the control system for the devices in the predetermined area of space, the sensing component, the HVAC control unit and the control method thereof. Although only some implementation modes of the present invention are described, one skilled in the art shall understand that the present invention may be implemented in many other modes without departing from the essence and scope thereof. For example, the control signal generation unit 192 in the embodiments illustrated in FIG. 3 and FIG. 6 is disposed in the sensing component 110, and when indoor air end devices are changed to other types of end devices, the end device control signals are correspondingly changed to other types of end device control signals. Therefore, the presented examples and implementation modes are considered to be exemplary instead of restrictive. The present invention possibly covers various modifications and replacements without departing from the spirit and scope of the present invention as defined by the annexed claims.

The invention claimed is:

1. A system for controlling a device in at least one predetermined area of space, the device in the predetermined area of space comprising one or more air end devices of a Heating, Ventilation and Air Conditioning HVAC system installed in the predetermined area of space, the system comprising:
a sensing component installed in the predetermined area of space and used for sensing the predetermined area of space to at least determine density information of living beings in the predetermined area of space; and
an HVAC control and management unit of the HVAC system,
wherein the sensing component is interactively connected with the HVAC control and management unit in a wireless communication mode, and the HVAC control and management unit is configured to control the one or more air end devices at least based on the determined density information of living beings;
the HVAC control and management unit includes:
a heat estimate distribution map generation module configured to generate a heat estimate distribution map of the predetermined area of space at least based on the density information of living beings; and
a control signal generation unit configured to generate a plurality of different first end device control signals based on heat distribution differences between different subareas in the heat estimate distribution map.

2. The system according to claim 1, wherein the sensing component is further configured to comprise: a wireless sending unit used for wirelessly sending at least the density information of living beings;
and the HVAC control and management unit is provided with:
a wireless receiving unit used for wirelessly receiving the density information of living beings; and
the control signal generation unit configured to generate a first end device control signal at least based on the determined density information of living beings.

3. The system according to claim 2, wherein the system further comprises: biometric sensors located in the predetermined area of space, each of the biometric sensors being connected with the sensing component in a wireless communication mode;
wherein the biometric sensors acquire predetermined biometric information of people and wirelessly send the biometric information to the sensing component, the sensing component wirelessly sends the received biometric information to the HVAC control and management unit, and the HVAC control and management unit is further configured to control the air end devices at least based on the predetermined biometric information acquired by the biometric sensors in the predetermined area of space.

4. The system according to claim 3, wherein the biometric information comprises at least one of: body temperature, body surface humidity, heart rate, electrocardiogram and respiratory rate.

5. The system according to claim 3, wherein the control signal generation unit is further configured to adjust and change the first end device control signal based on the predetermined biometric information acquired by the biometric sensors in the predetermined area of space, so as to obtain a second end device control signal;

and the air end devices are further configured to be capable of being controlled based on the second end device control signal.

6. The system according to claim 5, wherein the control signal generation unit is further provided with a first judgement module configured to perform statistical analysis based on the predetermined biometric information of people acquired by all biometric sensors in the predetermined area of space, and the control signal generation unit adjusts and changes the first end device control signal only when more than a predetermined proportion of biometric sensors reflect that the current first end device control signal needs to be changed.

7. The system according to claim 3, wherein the biometric sensors are implemented by means of wearable devices.

8. The system according to claim 2, wherein the system further comprises personal terminal adjustment components used for individuals in the predetermined area of space to actively give instructions for adjusting and setting the air end devices;

wherein each of the personal terminal adjustment components is connected with the sensing component in a wireless communication mode, the instructions for adjusting and setting the air end devices are wirelessly sent to the sensing component, the sensing component wirelessly sends the received instructions to the HVAC control and management unit, and the HVAC control and management unit is further configured to control the air end devices at least based on the instructions for adjusting and setting the air end devices.

9. The system according to claim 8, wherein the control signal generation unit is further configured to adjust and change the first end device control signal based on all of the instructions for adjusting and setting the air end devices in the predetermined area of space, so as to obtain a third end device control signal;

and the air end devices are further configured to be capable of being controlled based on the third end device control signal.

10. The system according to claim 9, wherein the control signal generation unit is further provided with a second judgement module configured to perform statistical analysis based on all of the instructions for adjusting and setting the air end devices in the predetermined area of space, and the control signal generation unit adjusts and changes the first end device control signal only when more than a predetermined proportion of personal terminal adjustment components reflect that the current first end device control signal needs to be changed.

11. The system according to claim 8, wherein the personal terminal adjustment components are implemented by means of wearable devices or portable intelligent terminals.

12. The system according to claim 1, wherein the sensing component is further provided with an indoor environment sensor; and the system is configured to be capable of controlling the air end devices based on information acquired by the sensor.

13. The system according to claim 1, wherein the system further comprises a data management device used for storing and managing at least the density information of living beings in the sensing component, the sensing component is connected with the data management device in a wireless communication mode, and the density information of living beings is wirelessly sent to the data management device in real time or at a predetermined time interval.

14. The system according to claim 13, wherein the data management device is a cloud data platform, and a computer terminal connected with the cloud data platform is capable of obtaining the density information of living beings corresponding to one or more predetermined areas of space in the cloud data platform under a situation that the computer terminal passes verification.

15. The system according to claim 1, wherein the device in the predetermined area of space comprises illumination components, projectors or a meeting room booking system installed in the predetermined area of space;

wherein the sensing component is interactively connected with the illumination components, the projectors or the meeting room booking system in a wireless communication mode, and the system is configured to control the illumination components, the projectors or the meeting room booking system at least based on the determined density information of living beings.

16. The system according to claim 1, wherein the sensing component comprises a sensing unit used for sensing the predetermined area of space, the sensing unit being a visual sensor and/or a depth information sensor.

17. A system for controlling a device in at least one predetermined area of space, the device in the predetermined area of space comprising one or more air end devices of a Heating, Ventilation and Air Conditioning HVAC system installed in the predetermined area of space, the system comprising:

a sensing component installed in the predetermined area of space and used for sensing the predetermined area of space to at least determine density information of living beings in the predetermined area of space; and an HVAC control and management unit of the HVAC system, wherein the sensing component is interactively connected with the HVAC control and management unit in a wireless communication mode, and the HVAC control and management unit is configured to control the one or more air end devices at least based on the determined density information of living beings;

wherein the sensing component includes a wireless sending unit used for wirelessly sending at least the density information of living beings;

and the HVAC control and management unit includes:

a wireless receiving unit used for wirelessly receiving the density information of living beings; and a control signal generation unit configured to generate a first end device control signal at least based on the determined density information of living beings;

wherein the density information of living beings comprises density distribution information of people, the density distribution information of people being capable of reflecting different population density distributions in the predetermined area of space;

the control signal generation unit includes:

a heat estimate distribution map generation module configured to generate a heat estimate distribution map of the predetermined area of space at least based on the density distribution information of people; and a control signal generation module configured to generate a plurality of different first end device control signals based on heat distribution differences between different subareas in the heat estimate distribution map;

wherein the different first end device control signals are respectively used for controlling the air end devices in corresponding subareas.

18. The system according to claim 17, wherein installation position information of each air end device within the predetermined area of space is recorded in the HVAC control and management unit, and one of the plurality of different first end device control signals is enabled to correspond to the air end device based on the installation position information of each air end device.

19. A method for controlling a device in at least one predetermined area of space, the device in the predetermined area of space comprising one or more air end devices of a Heating, Ventilation and Air Conditioning HVAC system installed in the predetermined area of space, the method comprising:

sensing the predetermined area of space through a sensing component installed in the predetermined area of space;

at least determining density information of living beings in the predetermined area of space; and under a situation that an interactive connection is established between the sensing component and an HVAC control and management unit of the HVAC system in a wireless communication mode, controlling the one or more air end devices at least based on the determined density information of living beings, wherein the HVAC control and management unit is connected with the one or more air end devices;

wherein controlling the one or more air end devices includes:

generating a heat estimate distribution map of the predetermined area of space at least based on the density information of living beings; and generating a plurality of different first end device control signals based on heat distribution differences between different subareas in the heat estimate distribution map.

* * * * *